(12) United States Patent
Bondarenko et al.

(10) Patent No.: US 12,475,048 B2
(45) Date of Patent: Nov. 18, 2025

(54) LINEFILL DELEGATION IN A CACHE HIERARCHY

(71) Applicant: Arm Limited, Cambridge (GB)

(72) Inventors: Natalya Bondarenko, Antibes (FR); Stefano Ghiggini, Antibes (FR); Kamil Garifullin, Nice (FR); Fabian Gruber, Birmingham (GB); Abhishek Raja, Niagara Falls, NY (US); Devin S Lafford, Austin, TX (US)

(73) Assignee: Arm Limited, Cambridge (GB)

( * ) Notice: Subject to any disclaimer, the term of this patent is extended or adjusted under 35 U.S.C. 154(b) by 90 days.

(21) Appl. No.: 18/350,217

(22) Filed: Jul. 11, 2023

(65) Prior Publication Data

US 2025/0021480 A1 Jan. 16, 2025

(51) Int. Cl.
*G06F 12/0811* (2016.01)
*G06F 12/0862* (2016.01)
*G06F 12/0871* (2016.01)

(52) U.S. Cl.
CPC ...... *G06F 12/0811* (2013.01); *G06F 12/0862* (2013.01); *G06F 12/0871* (2013.01)

(58) Field of Classification Search
None
See application file for complete search history.

(56) References Cited

U.S. PATENT DOCUMENTS

| | | | | |
|---|---|---|---|---|
| 6,734,538 B1 * | 5/2004 | Sturcken | ............ | H01L 25/0657 438/455 |
| 6,970,976 B1 * | 11/2005 | Arimilli | ............ | G06F 12/0897 711/E12.051 |
| 9,081,689 B2 * | 7/2015 | Pho | ............ | G06F 12/0859 |
| 12,072,803 B1 * | 8/2024 | King | ............ | G06F 9/30043 |
| 2006/0224829 A1 * | 10/2006 | Evrard | ............ | G06F 12/0897 711/E12.043 |
| 2007/0079070 A1 * | 4/2007 | Piry | ............ | G06F 12/0888 711/118 |
| 2008/0028150 A1 * | 1/2008 | Toussi | ............ | G06F 12/0897 711/E12.043 |
| 2008/0120468 A1 * | 5/2008 | Davis | ............ | G06F 9/3802 711/E12.001 |
| 2015/0026411 A1 * | 1/2015 | Lippert | ............ | G06F 12/0833 711/146 |

* cited by examiner

*Primary Examiner* — Yaima Rigol
(74) *Attorney, Agent, or Firm* — NIXON & VANDERHYE P.C.

(57) ABSTRACT

Apparatuses, methods, systems, and chip-containing products are disclosed, which relate to an arrangement comprising a level N cache level and a level M cache level, where M is greater than N. The level N cache level comprises a plurality of linefill slots and performs a slot allocation procedure in response to a lookup miss in dependence on a linefill slot occupancy criterion. The slot allocation procedure comprises allocation of an available slot of the plurality of slots to a pending linefill request generated in response to the lookup miss. The level N cache level effects a modification of the slot allocation procedure in dependence on the linefill slot occupancy criterion and is responsive to the linefill slot occupancy criterion being fulfilled to cause a linefill delegation action to be instructed to the level M cache level.

20 Claims, 7 Drawing Sheets

LINEFILL DELEGATION IN A CACHE HIERARCHY

TECHNICAL FIELD

The present disclosure relates to data processing. In particular, the present disclosure relates to the operation of cache levels in a data processing apparatus.

DESCRIPTION

A cache level in a data processing apparatus is arranged to perform a lookup in response to data access request it receives. In the event of a cache miss the cache level will cause a linefill request for the required data item to be propagated further in the memory hierarchy and, once the cache line comprising the required data item is returned, it will carry out a linefill comprising that data item to cause the data item to be inserted into the cache level. For this purpose, the cache level comprises a plurality of linefill slots, one of which will be allocated to a pending linefill request. The necessarily finite number of linefill slots of the cache level can result in the stalling of new requests until a linefill slot becomes available.

SUMMARY

In one example embodiment described herein there is an apparatus comprising:
 a level N cache level; and
 a level M cache level, where M is greater than N,
 wherein the level N cache level comprises a plurality of linefill slots and the level N cache level is configured to perform a slot allocation procedure in response to a lookup miss in dependence on a linefill slot occupancy criterion, wherein the slot allocation procedure comprises allocation of an available slot of the plurality of slots to a pending linefill request generated in response to the lookup miss,
 wherein the level N cache level is configured to effect a modification of the slot allocation procedure in dependence on the linefill slot occupancy criterion,
 and wherein the level N cache level is responsive to the linefill slot occupancy criterion being fulfilled to cause a linefill delegation action to be instructed to the level M cache level.

In one example embodiment described herein there is a method of operating an apparatus comprising a level N cache level and a level M cache level, the method comprising:
 in the level N cache level comprising a plurality of linefill slots, performing a slot allocation procedure in response to a lookup miss in dependence on a linefill slot occupancy criterion, wherein the slot allocation procedure comprises allocation of an available slot of the plurality of slots to a pending linefill request generated in response to the lookup miss;
 in the level N cache level, effecting a modification of the slot allocation procedure in dependence on the linefill slot occupancy criterion; and
 in response to the linefill slot occupancy criterion being fulfilled, causing linefill delegation action to be instructed to the level M cache level.

In one example embodiment described herein there is a system comprising:
 the apparatus of the above-mentioned example embodiment, implemented in at least one packaged chip;
 at least one system component; and
 a board,
 wherein the at least one packaged chip and the at least one system component are assembled on the board.

In one example embodiment described herein there is a chip-containing product comprising the above-mentioned example system assembled on a further board with at least one other product component.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising:
 a level N cache level; and
 a level M cache level, where M is greater than N,
 wherein the level N cache level comprises a plurality of linefill slots and the level N cache level is configured to perform a slot allocation procedure in response to a lookup miss in dependence on a linefill slot occupancy criterion, wherein the slot allocation procedure comprises allocation of an available slot of the plurality of slots to a pending linefill request generated in response to the lookup miss,
 wherein the level N cache level is configured to effect a modification of the slot allocation procedure in dependence on the linefill slot occupancy criterion,
 and wherein the level N cache level is responsive to the linefill slot occupancy criterion being fulfilled to cause a linefill delegation action to be instructed to the level M cache level.

The present techniques recognise that the finite number of linefill slots which are provided in association with a given cache level can represent a bottleneck in servicing cache requests. In particular, when the cache miss rate is sufficiently high that new linefill requests occur more frequently than they can be accommodated by the linefill slots of the cache level (because they are already occupied awaiting fulfilment by linefill responses returning from a further cache level or memory component), this leads to stalling of the establishment those new linefill requests and in turn to a delay in the processing which is reliant on the data which is the subject of the cache request. The present techniques further recognise that such delays may be mitigated by modifying a slot allocation procedure according to which linefill slots are allocated to new linefill requests following a cache miss and, dependent on a linefill slot occupancy criterion, causing a linefill delegation action to be instructed to a further cache level. This linefill delegation action can make use of the further cache level's resources to service the cache request that missed. The relevant cache levels are referred to above as a level N cache level and a level M cache level, where M is greater than N. That is to say, that the level N cache level is nearer the data processing agent generating the cache requests than the level M cache level, which itself is nearer the memory in which the subject data items are stored. Thus, these may be adjacent cache levels, e.g. L1 and L2, or L2 and L3, or equally they may be separated by at least one other cache level, e.g. L1 and L3. The present techniques are not limited to any particular cache level pair.

The modification of the slot allocation procedure and the linefill delegation action may take a variety of forms. The present techniques recognises that linefill requests can be generated by a variety of requesters and that accordingly there is the opportunity to prioritise these requests differently. For example, whilst some linefill requests relate to "demand" requests generated in response to a confirmed need for the corresponding data item, other linefill requests may relate to more speculative requests generated in support of performance-enhancement techniques, such as branch prediction or data prefetching. Accordingly, it is proposed that the modification of the slot allocation procedure and the linefill delegation action may be set in recognition of these differences. Consequently, in some examples, the modification of the slot allocation procedure comprises:

selection of a victim slot of the plurality of linefill slots currently awaiting completion of a previously allocated linefill request; and
allocation of the victim slot to the pending linefill request generated in response to the lookup miss,
and wherein the linefill delegation action instructed to the level M cache level comprises cancellation of a scheduled line fill response from the level M cache level to the level N cache level in respect of the previously allocated linefill request.

Accordingly, when a suitable victim slot of the plurality of linefill slots can be identified, for example where that slot is identified as being allocated to a non-demand request, this linefill request can be delegated by the level N cache level to the level M cache level, thus freeing up that slot for use by a linefill request generated in response to the lookup miss. Further, this then means that a scheduled line fill response from the level M cache level to the level N cache level in respect of the victim linefill request can be cancelled.

Equally, the present techniques recognise that there may be circumstances when there are no suitable victim slots of the plurality of linefill slots, for example when all slots have been allocated to demand requests. Nevertheless it is proposed that a linefill delegation action instructed to the level M cache level can support forward progress of the cache request. Whether linefill slot allocation at the level N cache level is then performed is then conditionally determined. That is, under some conditions slot allocation in response to the lookup miss is avoided, whilst under other conditions the slot allocation in response to the lookup miss proceeds as normal. Hence in such example cases, the apparatus further comprises level M cache control circuitry configured to retrieve data into the level M cache level, wherein the modification of the slot allocation procedure comprises:
conditional avoidance of slot allocation in response to the lookup miss,
and wherein the linefill delegation action instructed to the level M cache level comprises instructing the level M cache control circuitry to retrieve data corresponding to the linefill request into the level M cache level.

The present techniques further propose that, in cache hierarchies with an associated prefetch pipeline, the capabilities of that prefetch pipeline may be made use of as part of the techniques proposed. Accordingly, in some examples the apparatus further comprises level M prefetch circuitry configured to prefetch data into the level M cache level, wherein the modification of the slot allocation procedure comprises:
conditional avoidance of slot allocation in response to the lookup miss,
and wherein the linefill delegation action instructed to the level M cache level comprises instructing the level M prefetch circuitry to prefetch data corresponding to the linefill request into the level M cache level.

In some examples, the conditional avoidance of slot allocation is conditional on a request type of a request that resulted in the lookup miss. In some such examples, the request type is one of an architecturally mandatory request and an architecturally non-mandatory request. In particular in such cases, only when the request type is an architecturally non-mandatory request is the slot allocation in response to the lookup miss avoided. In the event that the request type is an architecturally mandatory request, the slot allocation in response to the lookup miss proceeds as normal. That is, for demand requests, the option to suppress the line allocation is not available, since the data for a demand request needs to be made available in the cache level at which it is requested.

The linefill slot occupancy criterion, in dependence on which the slot allocation procedure is performed in response to a lookup miss, may take a variety of forms. That is to say that the condition (or conditions) under which a modification of the slot allocation procedure is carried out and under which a linefill delegation action is caused to be performed can take various forms, depending on the particular needs of a given cache hierarchy implementing the present techniques.

In some examples, the linefill slot occupancy criterion comprises at least a threshold number of the plurality of linefill slots currently having a pending linefill request allocated.

In some examples, the linefill slot occupancy criterion comprises all of the plurality of linefill slots currently having a pending linefill request allocated.

In examples in which there is selection of a victim slot of the plurality of linefill slots currently awaiting completion of a previously allocated linefill request, the selection of the victim slot may be dependent on a variety of factors.

In some examples, the level N cache level is configured to select the victim slot in dependence on a request type of the previously allocated linefill request.

In some examples, the request type of the previously allocated linefill request is an architecturally non-mandatory request. That is, it is not a "demand" request.

Such architecturally non-mandatory requests may take a variety of forms, but in some examples, the previously allocated linefill request pertains to branch prediction based instruction retrieval subsequently established to be mispredicted. In some such examples, the previously allocated linefill request pertains to data value retrieval initiated by a prefetch mechanism. In some examples, the prefetch mechanism has been triggered by execution of a software prefetch instruction. In some examples, the previously allocated linefill request pertains to speculative load/store mechanism retrieval which has subsequently been cancelled. In some examples, the request type of the previously allocated linefill request is a relative age with respect to other allocated linefill requests in the plurality of linefill slots.

As mentioned above, there may be examples in which branch prediction outcome information is used as part of the control mechanism, in the example where a victim linefill slot may be selected when it is identified as relating to branch prediction based instruction retrieval that has subsequently established to be mispredicted. Such branch prediction outcome information can be used as part of the control mechanism in other ways and in some examples the apparatus further comprises branch prediction instruction retrieval handling circuitry, wherein the branch prediction instruction retrieval handling circuitry is configured to receive:
a first instruction address indication corresponding to a predicted branch direction;
a second instruction address indication corresponding to the predicted branch direction not being taken;
and the branch prediction instruction retrieval handling circuitry is configured to initiate a first lookup based on the first instruction address indication in the level N cache level and to initiate a second lookup based on the second instruction address indication in the level M cache level.

In cases where a branch prediction mechanism makes a prediction about the direction that program flow will follow after a certain branch in program code, this direction will form the normal sequence of instructions and data which a processor will require to continue its data processing operations. Nevertheless, the present techniques recognise that the other direction which could have been followed after that branch may on occasion turn out to be the required data processing direction. However the occasions on which the branch prediction turns out to be incorrect will typically be sufficiently infrequent to justify bringing instructions relating to both paths into the local caches of the processor in parallel. The approach proposed here is to initiate a first lookup based on the first instruction address indication in the level N cache level and to initiate a second lookup based on the second instruction address indication in the level M cache level. This prioritises the first instruction, but does not entirely neglect the second instruction, and should that second instruction prove to be required, then it is more readily retrievable from the level M cache level, than it would otherwise be from memory.

Various performance metrics may be used to control the modification of the slot allocation procedure and the causation of the linefill delegation action. In some examples, the modification of the slot allocation procedure and causation of the linefill delegation action are dependent on: a signal indicative of a high cache miss rate at the level N cache level. In some examples, the modification of the slot allocation procedure and causation of the linefill delegation action are dependent on a signal indicative of a high branch misprediction rate. In some examples, the modification of the slot allocation procedure and causation of the linefill delegation action are dependent on a signal indicative of a high prefetch accuracy. In some examples, the modification of the slot allocation procedure and causation of the linefill delegation action are dependent on a signal indicative of a high cache hit rate at the level M cache level. In some examples, the modification of the slot allocation procedure and causation of the linefill delegation action are dependent on a signal indicative of a cache resource availability at the level M cache level.

As mentioned above the present techniques are not limited to any particular pair of cache levels, but in some examples, the level N cache level is a L1 cache level; and the level M cache level is an L2 cache level.

In accordance with one example configuration there is provided a method of operating an apparatus comprising a level N cache level and a level M cache level, the method comprising:
in the level N cache level comprising a plurality of linefill slots, performing a slot allocation procedure in response to a lookup miss in dependence on a linefill slot occupancy criterion, wherein the slot allocation procedure comprises allocation of an available slot of the plurality of slots to a pending linefill request generated in response to the lookup miss;
in the level N cache level, effecting a modification of the slot allocation procedure in dependence on the linefill slot occupancy criterion; and in response to the linefill slot occupancy criterion being fulfilled, causing linefill delegation action to be instructed to the level M cache level.

In accordance with one example configuration there is provided a system comprising: the apparatus of any of the above examples, implemented in at least one packaged chip;
at least one system component; and
a board,
wherein the at least one packaged chip and the at least one system component are assembled on the board.

In accordance with one example configuration there is provided a chip-containing product comprising the above example system assembled on a further board with at least one other product component.

Particular embodiments will now be described with reference to the figures.

Figure 1:
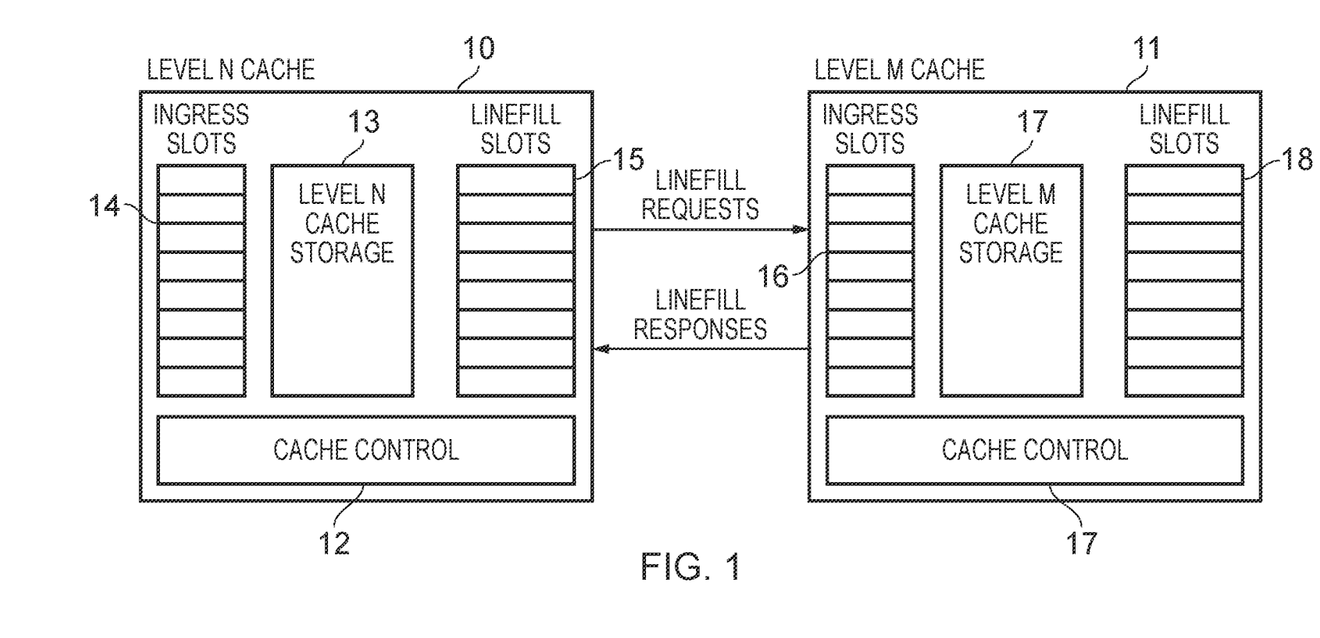
FIG. 1 schematically illustrates two example cache levels in accordance with some examples.

FIG. 1 schematically illustrates two example cache levels 10 and 11 in accordance with some examples. These cache levels could form part of a larger cache hierarchy or could be the only cache levels forming a cache hierarchy. In a manner with which one of ordinary skill in the art will be familiar, a cache request received by the first ("level N") cache level 10 will cause, under the control of the cache control circuitry 12, a cache lookup to be performed to determine whether a cache line holding the data that is the subject of the cache request is currently stored in the level N cache storage 13. When it is present (a cache hit) the required data is returned in response to the cache request. The level N cache 10 can receive multiple cache requests, each of which will take some time to process and (especially in the case of a cache miss) to respond to with the required data. A set of ingress slots 14 is provided, each of which corresponds to a received cache request whilst it is being handled. When the cache lookup results in a cache miss, the cache request needs to be passed further along the cache hierarchy, in this case to the level M cache 11. A set of linefill slots 15 is provided to support this, whereby a cache request for which a lookup has missed in the level N cache 10 is allocated to a slot of the linefill slots and a corresponding linefill request is passed to the level M cache 11.

The level M cache level 11 is similarly configured to the level N cache level, having ingress slots 16, cache control 17, level M cache storage 17, and linefill slots 18. A linefill request received by the level M cache 11 from the level N cache 10 is thus allocated to one of the ingress slots 16, following which, under the control of the cache control circuitry 17, a cache lookup is performed to determine whether the required cache line is currently stored in the level M cache storage 17. When it is present (a cache hit) the required data (the cache line) is returned as a linefill response from the level M cache 11 to the level N cache 10. The linefill slot allocated to this request of the linefill slots 15 can then provide the cache line for storage in the level N cache storage 13 and to respond to the original cache request received by the cache level 10. Otherwise, when the cache lookup in the level M cache results in a cache miss, the cache request needs to be passed still further (either to a further cache level or to the memory in which data is stored). The set of linefill slots 18 is provided to support this, whereby a cache request which has missed in the level M cache 11 is allocated to a slot of the linefill slots 18 pending a corresponding linefill response being received (from the further cache level or the memory).

Referring to the linefill slots 15 of the level N cache 10, the finite number of these linefill slots can represent a bottleneck in the level N cache's ability to service cache requests. In particular, when the cache miss rate of the level N cache 10 is sufficiently high that new linefill requests occur more frequently than they can be accommodated by the linefill slots 15, this leads to stalling of the establishment those new linefill requests and in turn to a potential delay in the processing which is reliant on the data which is the subject of the cache request. The level N cache 10 is configured to address this issue by the deployment of a number of techniques with regard to the allocation of the linefill slots 15 and also by delegating certain tasks to the level M cache 11. These are discussed in more detail with reference to the further figures.

Figure 2:
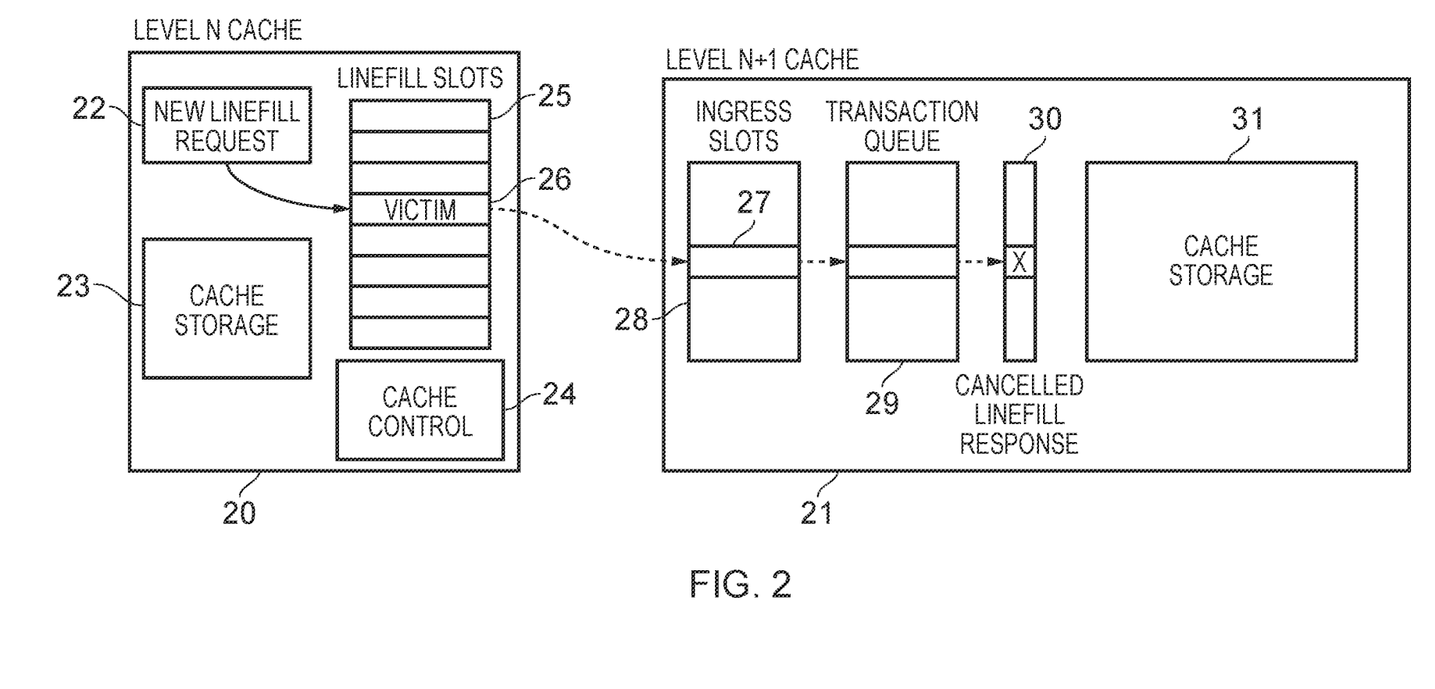
FIG. 2 schematically illustrates the eviction of a victim linefill slot at a level N cache to a level N+1 cache in accordance with some examples.

FIG. 2 schematically illustrates the eviction of a victim linefill slot at a level N cache 20 to a level N+1 cache 21 in accordance with some examples. A new linefill request 22 is schematically shown, this having resulted from a lookup in the cache storage 23 having missed. Moreover, in the example shown the cache control 24 determines, on the basis of the current occupancy of the linefill slots 25, that there is a suitable "victim" entry 26. This victim entry corresponds to an architecturally non-mandatory request, i.e. not a "demand" request, but rather one that has been generated by a performance enhancement technique such as branch prediction, data prefetching, or another speculative load/store mechanism. The cache control 24 causes the corresponding entry 27 in the ingress slots 28 of the level N+1 cache 21 to be determined, as well as the corresponding entry in the transaction queue 29. The transaction queue 29 further comprises information 30 in which cancellation of the corresponding line fill response is then recorded. Thus, when the corresponding cache line is/becomes available in the cache storage 31 of the level N+1 cache 21, where this would then previously have triggered a linefill response to return to the level N cache 20, this response is suppressed. The corresponding cache line nevertheless is available in the cache storage 31 of the level N+1 cache 21 and thus any renewed request for the data can be more quickly serviced than if no retrieval into the cache hierarchy had taken place. Furthermore, the slot 26 of the linefill slots 25 was freed up by this process, allowing the new linefill request 22 to occupy that slot and not to be stalled by the unavailability of a linefill slot. Correspondingly, the linefill request can then also be passed to the level N+1 cache level 21, allowing the new linefill request 22 to be serviced promptly.

Figure 3:
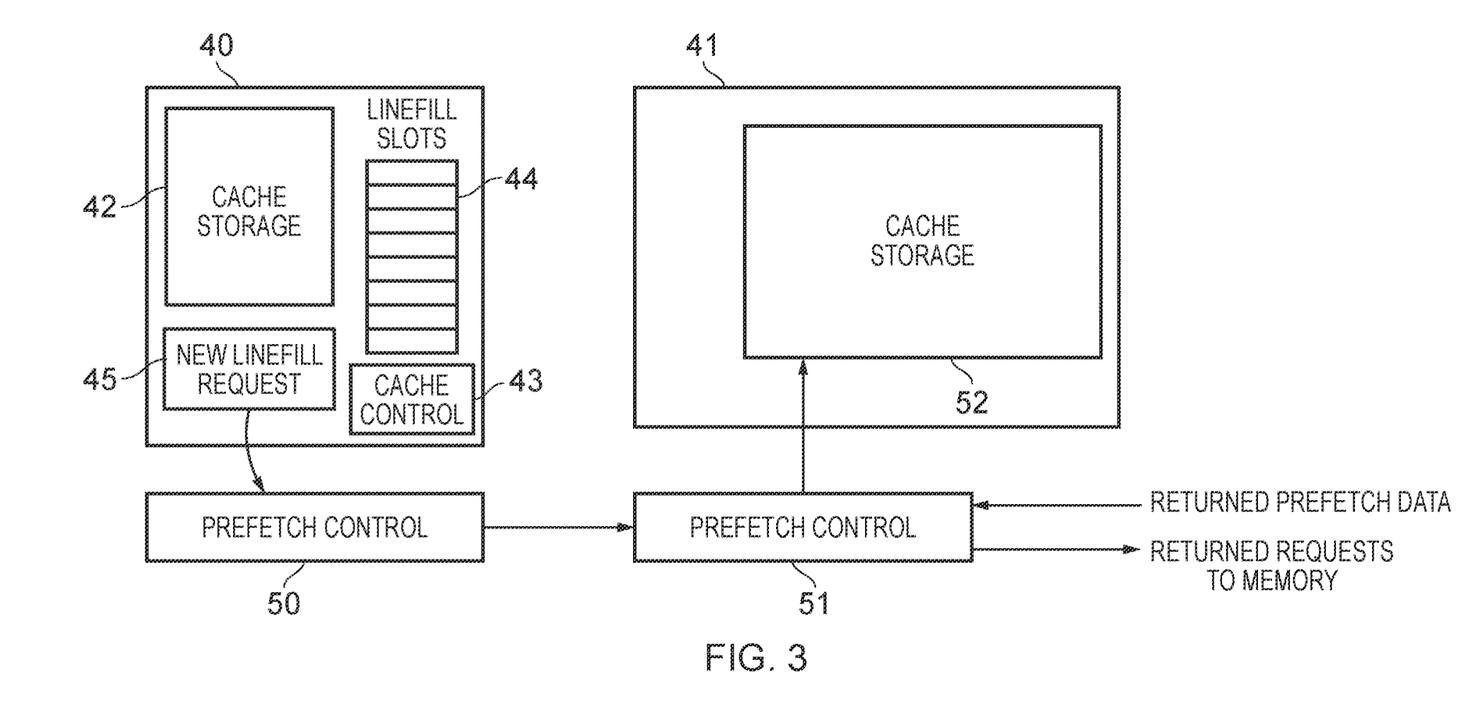
FIG. 3 schematically illustrates the use of a prefetch pipeline to delegate a linefill request from one cache level to another cache level in accordance with some examples.

FIG. 3 schematically illustrates the use of a prefetch pipeline to delegate a linefill request from a first cache level 40 to another cache level 41 in accordance with some examples. Here, a lookup in the cache storage 42 of the cache level 40 has resulted in a cache miss, yet the cache control 43 has further determined that the current linefill slot occupancy of the linefill slots 44 does not justify (or even does not permit) the selection of a victim linefill slot for the new linefill request 45 generated in response to the cache miss to evict. Instead, the approach taken is for the cache control 43 to pass a copy of the new linefill request 45 to the prefetch control 50 associated with this cache level. The prefetch control 50 forms part of a prefetch pipeline, which also comprises prefetch control 51 associated with the further cache level 41. Generally, prefetch requests are passed along the prefetch pipeline towards memory (to the right in the figure) and returned prefetch data passed in the other direction along the prefetch pipeline, populating the caches of the cache hierarchy, including the cache storage 52. According to the present techniques the cache control circuitry 43 of the cache level 40 makes use of the prefetch pipeline in order to delegate the new linefill request 45 to the cache level 41. The further handling of the new linefill request 45 within the first cache level 40 depends on the type of the request and in particular whether the request is a demand request or not (whether it is architecturally mandatory or not). A demand request will remain waiting for a linefill slot to become available (and thus it will follow the usual linefill procedure because slot allocation for these requests cannot be cancelled). However, a non-demand request may be cancelled from waiting for a linefill slot to become available, reducing the competition for linefill slots. This option may for example be made use of when the linefill slot availability is low (e.g. below a threshold).

Figure 4A:
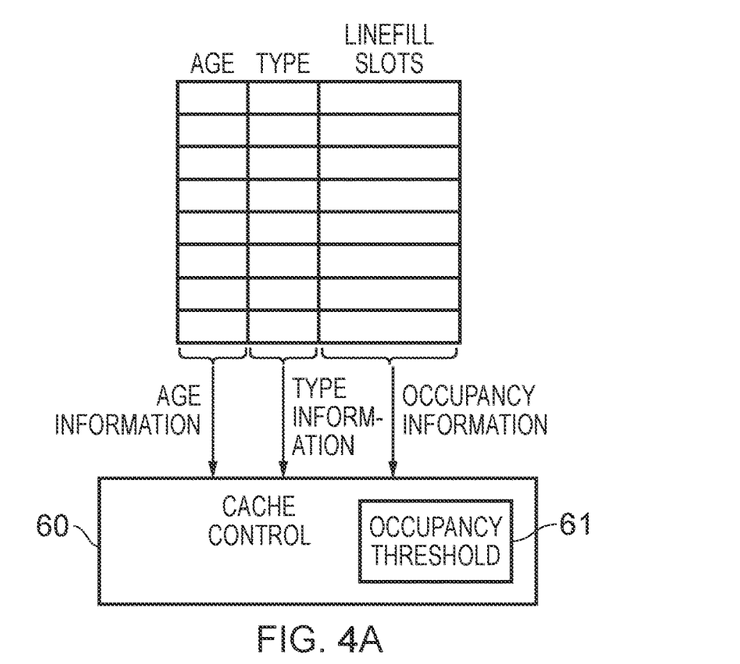
FIG. 4A schematically illustrates linefill slot occupancy control being based on at least one of age information, type information, and occupancy information for linefill slots in accordance with some examples.

FIG. 4A schematically illustrates linefill slot occupancy control being based on at least one of age information, type information, and occupancy information for linefill slots in accordance with some examples. The linefill slot occupancy criterion (or criteria) on which the linefill slot occupancy control is based can be variously defined. One straightforward metric which can form a linefill slot occupancy criterion is the number of currently occupied linefill slots, i.e. having a still pending linefill request allocated. For example, the cache control can be configured to compare the currently number of occupied linefill slots with a threshold value 61, and when the current occupancy meets (or exceeds) that threshold, the cache control causes new non-demand linefill requests to be delegated to a further cache level (e.g. to the next cache level) via one of the described mechanisms (e.g. the eviction of a pending linefill described with reference to FIG. 2 or the use of the prefetch mechanism described with reference to FIG. 3). Accordingly, by causing non-demand linefill requests to be handled at the further cache level, and notably by avoidance of slot allocation in response to the lookup miss, the pressure on availability of linefill slots at the cache level can be reduced. The setting of the threshold allows control over the likelihood of new linefill requests stalling. Set more aggressively (i.e. lower) and more non-demand linefill requests are delegated to a further cache level, though at the cost of some delay to the servicing of those non-demand linefill requests. Set more permissively (i.e. higher) and fewer non-demand linefill requests are delegated to a further cache level, though at the cost a higher risk of the stalling of some demand linefill requests. As shown in the figure, the linefill slots can also be populated by entries that have age and/or type information stored in association with them. This information may also be used in the linefill slot occupancy criterion (or criteria) on which the linefill slot occupancy control is based. Whether the linefill slot is of the "demand" type or the "non-demand" type is a prime example of a criterion on which the control is based. However, other type information may indicate that a linefill request pertains to branch prediction based instruction retrieval subsequently established to be mispredicted or data value retrieval initiated by a prefetch mechanism. Such linefill requests may be readily delegated to a further cache level without significant performance penalty. In some examples, the prefetch mechanism has been triggered by execution of a software prefetch instruction and this "type" may be recorded and made use of as a candidate category for delegation. In some examples, the type information may indicate that a linefill request pertains to speculative load/store mechanism retrieval that has subsequently been cancelled, and may therefore also be delegated without significant performance penalty. As shown, age information (i.e. indicative of how long a linefill request has been pending) may be made use of in this context. The shorter time period a linefill request has been pending, the less the penalty of delegating it. Conversely, generally the longer a linefill request has been pending, the sooner it can be expected to complete (and free the slot).

Figure 4B:
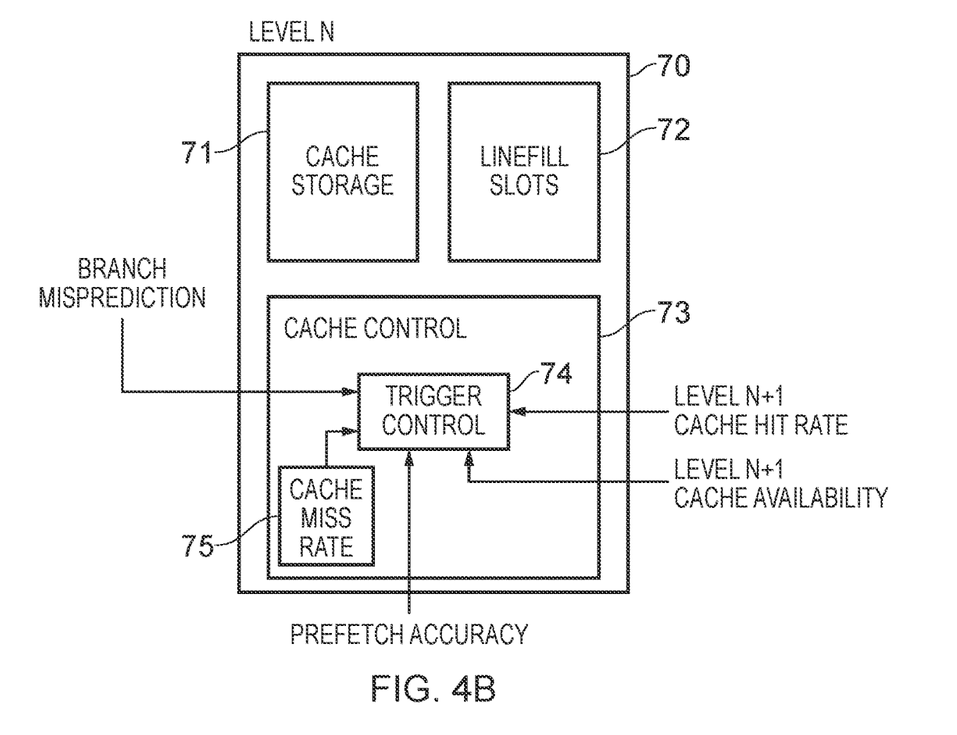
FIG. 4B schematically illustrates linefill slot occupancy control being based on at least one of branch misprediction information, cache miss rate information, cache hit rate information, and cache availability information in accordance with some examples.

FIG. 4B schematically illustrates a cache level N 70, i.e. this represents a cache level at an arbitrary level of a cache hierarchy. The cache level N 70 has cache storage 71, a set of linefill slots 72, and cache control circuitry 73. The cache control circuitry 73 is shown to comprise trigger control circuitry 74, which in this example is the component of the cache control circuitry which determines whether a linefill slot occupancy criterion is met and on that basis whether there should be modification of the slot allocation procedure and some linefill delegation action should be caused. For compactness of illustration the trigger control circuitry 74 is shown as having inputs which are indicative of all of: branch misprediction information, cache miss rate information (from monitoring 75 within the cache control 73), and information relating to the next cache level, namely cache level N+1 hit rate information and cache level N+1 availability information. It should be appreciated however that the trigger control circuitry may be configured to received only a subset (in any permutation) of these sources of information, depending on the particular implementation.

Figure 5:
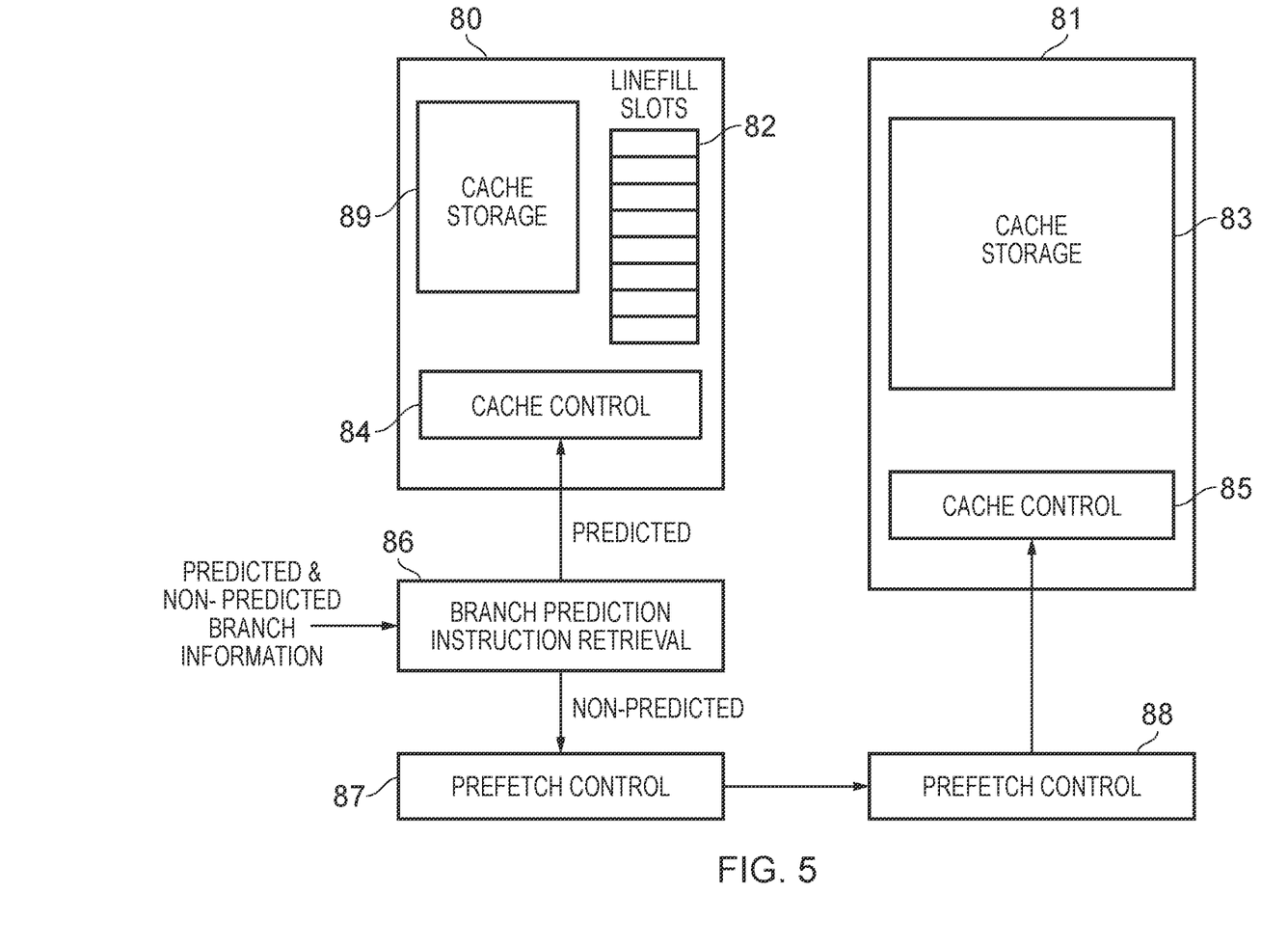
FIG. 5 schematically illustrates the use predicted and non-predicted branch information being used for cache control and prefetch pipeline control in accordance with some examples.

FIG. 5 schematically a further example cache hierarchy comprising a first cache level 80 and a second cache level 81. As is the case for all of the examples in this disclosure, this pair of illustrated cache levels may be adjacent cache levels (i.e. level N and level N+1, for arbitrary N) or may be separated by a further intervening cache level. The first cache level 80 is shown to comprise cache storage 89, linefill slots 82, and cache control 84. Associated with the cache level 80 is branch prediction instruction retrieval circuitry 86, which is configured to receive information relating to predicted (and non-predicted) branches from a branch prediction mechanism of the wider data processing apparatus of which is cache hierarchy forms part. That is, the branch prediction instruction retrieval circuitry 86 receives information relating to both the predicted branch target of a given branch and to the non-predicted branch target of that branch (i.e. the direction that will be taken if the branch prediction is incorrect). The predicted branch target information is passed to the cache control 84 of the first cache level 80 that causes a lookup for the relevant data (e.g. an instruction or data value associated with that target) in the cache storage 89. In the event of a cache miss, the linefill request is generated to bring the required cache line into the first cache level 80. The non-predicted branch target information is passed to the prefetch control 87 associated with the first cache level 80, which causes a prefetch request for the relevant data (e.g. an instruction or data value associated with that non-predicted target) to be passed down the prefetch pipeline to the prefetch control 88 associated with the second cache level 81. The prefetch control 88 interacts with the cache control 85 of the second cache level 81 to cause a lookup for the relevant data (e.g. an instruction or data value associated with that non-predicted target) in the cache storage 83 of the second cache level 81. In the event of a cache miss, a linefill request is generated to bring the required cache line into the second cache level 81. Accordingly, a mechanism is provided which "hedges" the prediction made by the branch prediction mechanism. On the assumption that the branch prediction mechanism is correct, then the correct (required) data should be present in the first cache level 80 when it is required. On those occasions when the branch prediction mechanism is incorrect, the required data should at least be present in the second cache level 81 when it is required and does not require a longer latency retrieval from further in the cache hierarchy/memory system.

Figure 6:
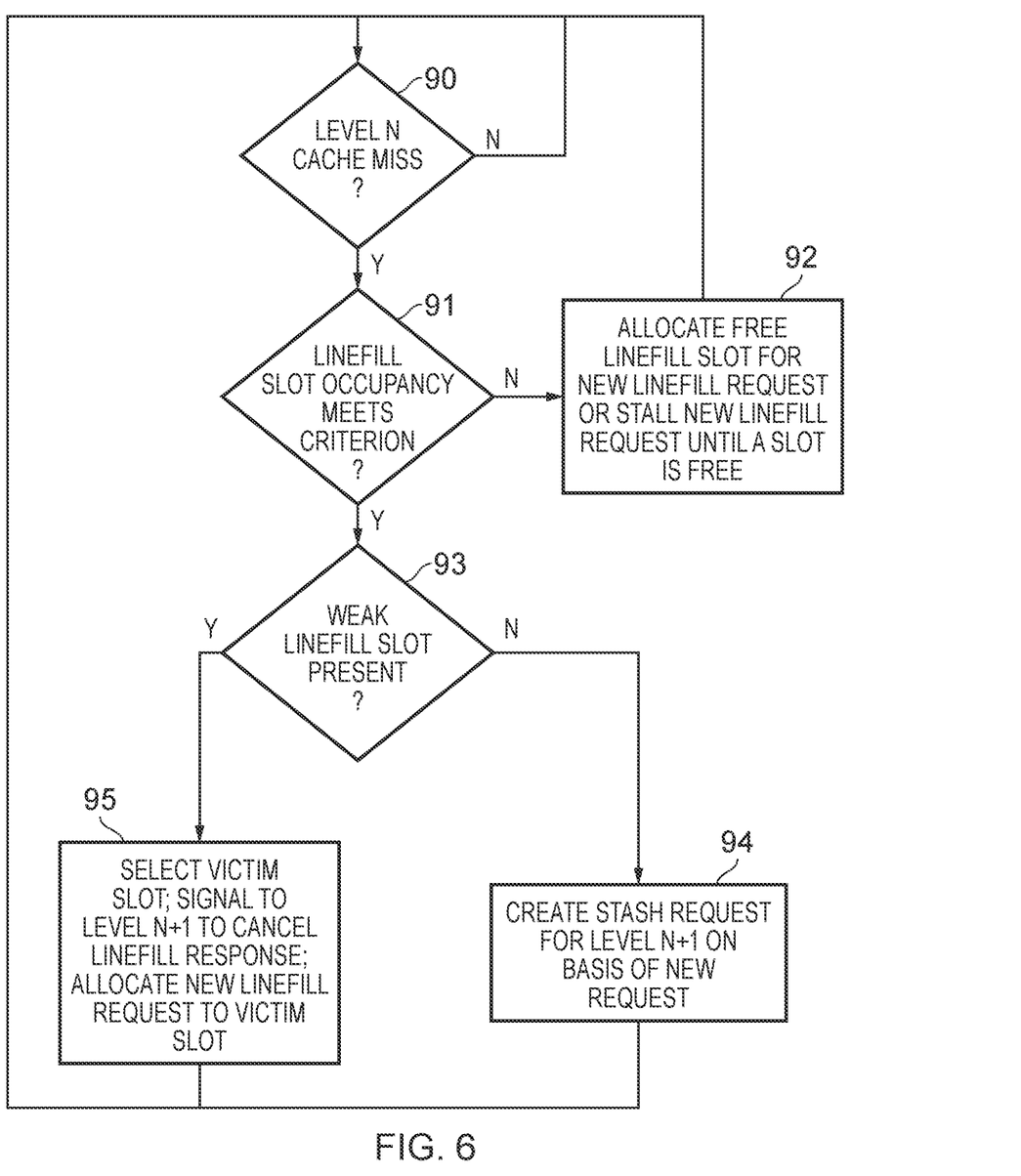
FIG. 6 is a flow diagram showing a sequence of steps which are taken in accordance with some examples.

FIG. 6 is a flow diagram showing a sequence of steps which are taken in accordance with some examples. The flow can be considered to begin at step 90, when a level N cache miss occurs. The flow loops on itself at this step until this is the case. It is then determined at step 91 whether the current linefill slot occupancy meets a predefined criterion. For example, this criterion may be set to require that a minimum number of linefill slots is currently occupied by pending linefill requests. When the current linefill slot occupancy does not meet the predefined criterion, the flow proceeds to step 92, at which either a free line slot is allocated for a new linefill request corresponding to the cache miss (if there is a free slot available) or the new linefill request stalls until a slot becomes available. The flow then returns to step 90. However, when at step 91 it is determined that the current line fill slot occupancy does meet the predefined criterion, the flow proceeds to step 93 at which it is determined whether there is currently a "weak" linefill slot, i.e. whether one of the occupied line fill slots is associated with a non-demand linefill request. When this is not the case, the flow proceeds to step 94 and a stash request corresponding to the required data is generated and passed to the next cache level (in this example cache level N+1, though noting that generally this could be cache level M, where M>N). Note that whether slot allocation in response to the lookup miss nevertheless continues at cache level N depends on the request type that resulted in the cache miss. A demand request at cache level N must be serviced at cache level N and thus the slot allocation will still occur. For a non-demand request it may be chosen to suppress the slot allocation at cache level N in order to reduce the slot pressure. The flow then returns to step 90. Alternatively, when it is determined at step 93 that there is currently a weak linefill slot, the flow proceeds to step 95, at which according to a defined victim selection rule, a victim slot of the occupied linefill slots is selected. A signal identifying this victim slot is passed to the next cache level, in order to cancel the corresponding linefill response, and the linefill slot thus freed up is then allocated to a new line fill request for the data that was the subject of the cache miss at step 90. The flow then returns to step 90.

The concepts described herein may be embodied in a system comprising at least one packaged chip. The apparatus (i.e. cache hierarchy) described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
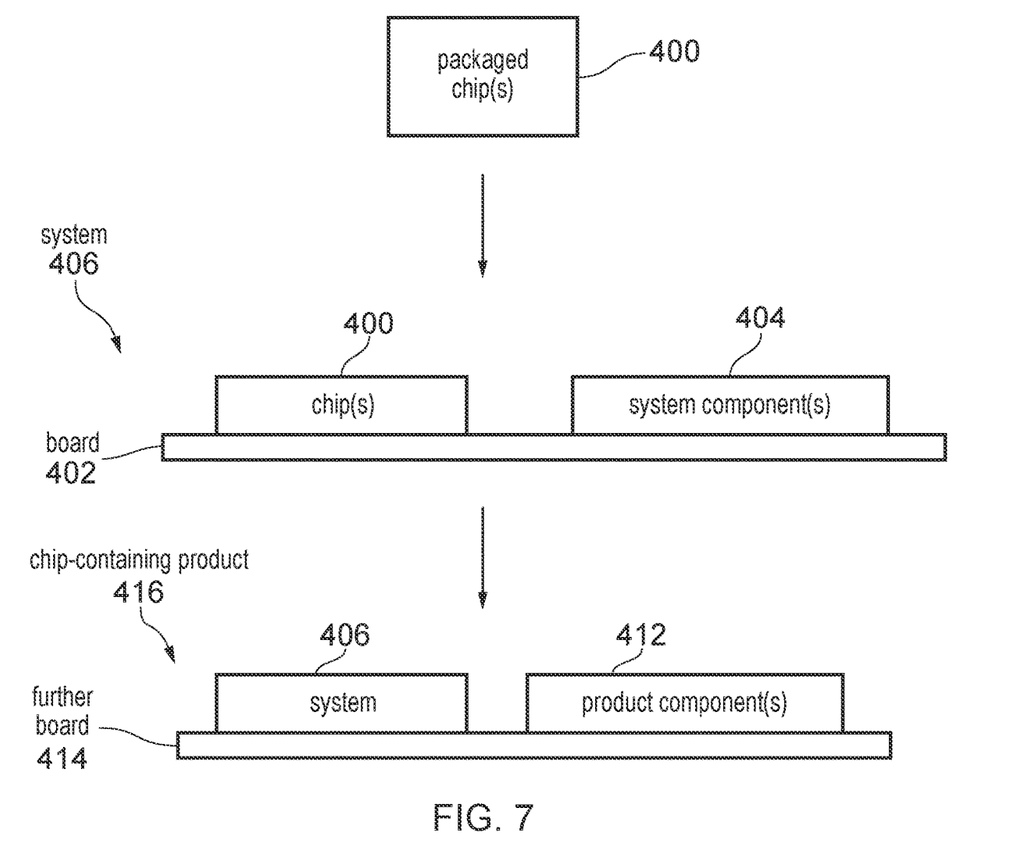
FIG. 7 schematically illustrates examples of the apparatus being embodied in a system comprising at least one packaged chip or in a chip-containing product comprising at least one such system.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components that are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Various proposed configurations of the presently disclosed techniques are set out in the following enumerated clauses:

Clause 1. Apparatus comprising:
    a level N cache level; and
    a level M cache level, where M is greater than N,
    wherein the level N cache level comprises a plurality of linefill slots and the level N cache level is configured to perform a slot allocation procedure in response to a lookup miss in dependence on a linefill slot occupancy criterion, wherein the slot allocation procedure comprises allocation of an available slot of the plurality of slots to a pending linefill request generated in response to the lookup miss,
    wherein the level N cache level is configured to effect a modification of the slot allocation procedure in dependence on the linefill slot occupancy criterion,
    and wherein the level N cache level is responsive to the linefill slot occupancy criterion being fulfilled to cause a linefill delegation action to be instructed to the level M cache level.

Clause 2. The apparatus as defined in Clause 1,
    wherein the modification of the slot allocation procedure comprises:
    selection of a victim slot of the plurality of linefill slots currently awaiting completion of a previously allocated linefill request; and
    allocation of the victim slot to the pending linefill request generated in response to the lookup miss,
    and wherein the linefill delegation action instructed to the level M cache level comprises cancellation of a scheduled line fill response from the level M cache level to the level N cache level in respect of the previously allocated linefill request.

Clause 3. The apparatus as defined in Clause 1, further comprising level M cache control circuitry configured to retrieve data into the level M cache level,
wherein the modification of the slot allocation procedure comprises:
conditional avoidance of slot allocation in response to the lookup miss,
and wherein the linefill delegation action instructed to the level M cache level comprises instructing the level M cache control circuitry to retrieve data corresponding to the linefill request into the level M cache level.

Clause 4. The apparatus as defined in Clause 1, further comprising level M prefetch circuitry configured to prefetch data into the level M cache level,
wherein the modification of the slot allocation procedure comprises:
conditional avoidance of slot allocation in response to the lookup miss,
and wherein the linefill delegation action instructed to the level M cache level comprises instructing the level M prefetch circuitry to prefetch data corresponding to the linefill request into the level M cache level.

Clause 5. The apparatus as defined in Clauses 3 or Clause 4, wherein the conditional avoidance of slot allocation is conditional on a request type of a request that resulted in the lookup miss.

Clause 6. The apparatus as defined in Clause 5, wherein the request type is one of an architecturally mandatory request and an architecturally non-mandatory request.

Clause 7. The apparatus as defined in any of Clauses 1-6, wherein the linefill slot occupancy criterion comprises at least a threshold number of the plurality of linefill slots currently having a pending linefill request allocated.

Clause 8. The apparatus as defined in any of Clauses 1-7, wherein the linefill slot occupancy criterion comprises all of the plurality of linefill slots currently having a pending linefill request allocated.

Clause 9. The apparatus as defined in Clause 2, or in any of Clauses 3-8 when dependent on Clause 2,
wherein the level N cache level is configured to select the victim slot in dependence on a request type of the previously allocated linefill request.

Clause 10. The apparatus as defined in Clause 9,
wherein the request type of the previously allocated linefill request is an architecturally non-mandatory request.

Clause 11. The apparatus as defined in Clause 10,
wherein the previously allocated linefill request pertains to branch prediction based instruction retrieval subsequently established to be mispredicted.

Clause 12. The apparatus as defined in Clause 10,
wherein the previously allocated linefill request pertains to data value retrieval initiated by a prefetch mechanism.

Clause 13. The apparatus as defined in Clause 12,
wherein the prefetch mechanism has been triggered by execution of a software prefetch instruction.

Clause 14. The apparatus as defined in Clause 10,
wherein the previously allocated linefill request pertains to speculative load/store mechanism retrieval which has subsequently been cancelled.

Clause 15. The apparatus as defined in Clause 9,
wherein the request type of the previously allocated linefill request is a relative age with respect to other allocated linefill requests in the plurality of linefill slots.

Clause 16. The apparatus as defined in any of Clauses 1-15, further comprising branch prediction instruction retrieval handling circuitry,
wherein the branch prediction instruction retrieval handling circuitry is configured to receive:
a first instruction address indication corresponding to a predicted branch direction;
a second instruction address indication corresponding to the predicted branch direction not being taken;
and the branch prediction instruction retrieval handling circuitry is configured to initiate a first lookup based on the first instruction address indication in the level N cache level and to initiate a second lookup based on the second instruction address indication in the level M cache level.

Clause 17. The apparatus as defined in any of Clauses 1-16,
wherein the modification of the slot allocation procedure and causation of the linefill delegation action are dependent on:
a signal indicative of a high cache miss rate at the level N cache level.

Clause 18. The apparatus as defined in any of Clauses 1-17,
wherein the modification of the slot allocation procedure and causation of the linefill delegation action are dependent on:
a signal indicative of a high branch misprediction rate.

Clause 19. The apparatus as defined in any of Clauses 1-18,
wherein the modification of the slot allocation procedure and causation of the linefill delegation action are dependent on:
a signal indicative of a high prefetch accuracy.

Clause 20. The apparatus as defined in any of Clauses 1-19,
wherein the modification of the slot allocation procedure and causation of the linefill delegation action are dependent on:
a signal indicative of a high cache hit rate at the level M cache level.

Clause 21. The apparatus as defined in any of Clauses 1-20,
wherein the modification of the slot allocation procedure and causation of the linefill delegation action are dependent on:
a signal indicative of a cache resource availability at the level M cache level.

Clause 22. The apparatus as defined in any of Clauses 1-21,
wherein the level N cache level is a L1 cache level; and
the level M cache level is an L2 cache level.

Clause 23. A method of operating an apparatus comprising a level N cache level and a level M cache level, the method comprising:
in the level N cache level comprising a plurality of linefill slots, performing a slot allocation procedure in response to a lookup miss in dependence on a linefill slot occupancy criterion, wherein the slot allocation procedure comprises allocation of an available slot of the plurality of slots to a pending linefill request generated in response to the lookup miss;
in the level N cache level, effecting a modification of the slot allocation procedure in dependence on the linefill slot occupancy criterion; and
in response to the linefill slot occupancy criterion being fulfilled, causing linefill delegation action to be instructed to the level M cache level.

Clause 24. A system comprising:
the apparatus of any of Clauses 1-22, implemented in at least one packaged chip;
at least one system component; and
a board,
wherein the at least one packaged chip and the at least one system component are assembled on the board.

Clause 25. A chip-containing product comprising the system of Clause 24 assembled on a further board with at least one other product component.

In brief overall summary apparatuses, methods, systems, and chip-containing products are disclosed, which relate to an arrangement comprising a level N cache level and a level M cache level, where M is greater than N. The level N cache level comprises a plurality of linefill slots and performs a slot allocation procedure in response to a lookup miss in dependence on a linefill slot occupancy criterion. The slot allocation procedure comprises allocation of an available slot of the plurality of slots to a pending linefill request generated in response to the lookup miss. The level N cache level effects a modification of the slot allocation procedure in dependence on the linefill slot occupancy criterion and is responsive to the linefill slot occupancy criterion being fulfilled to cause a linefill delegation action to be instructed to the level M cache level.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
a level N cache level; and
a level M cache level, where M is greater than N,
wherein the level N cache level comprises a cache storage and a plurality of linefill slots and the level N cache level is configured to perform a slot allocation procedure in response to a lookup miss in the cache storage, in dependence on a linefill slot occupancy criterion, wherein the slot allocation procedure comprises allocation of an available linefill slot of the plurality of linefill slots to a pending linefill request generated in response to the lookup miss,
wherein on completion of the pending linefill request, the linefill slot allocated to the pending linefill request is configured to provide a cache line within the cache storage to store data returned by the linefill request,
wherein the linefill slot allocated to the pending linefill request is freed upon completion of the pending linefill request,
wherein the level N cache level is configured to effect a modification of the slot allocation procedure in dependence on the linefill slot occupancy criterion,
and wherein the level N cache level is responsive to the linefill slot occupancy criterion being fulfilled to cause a linefill delegation action to be instructed to the level M cache level.

2. The apparatus as claimed in claim 1,
wherein the modification of the slot allocation procedure comprises:
selection of a victim slot of the plurality of linefill slots currently awaiting completion of a previously allocated linefill request; and
allocation of the victim slot to the pending linefill request generated in response to the lookup miss,
and wherein the linefill delegation action instructed to the level M cache level comprises cancellation of a scheduled line fill response from the level M cache level to the level N cache level in respect of the previously allocated linefill request.

3. The apparatus as claimed in claim 1, further comprising level M cache control circuitry configured to retrieve data into the level M cache level,
wherein the modification of the slot allocation procedure comprises:
conditional avoidance of slot allocation in response to the lookup miss,
and wherein the linefill delegation action instructed to the level M cache level comprises instructing the level M cache control circuitry to retrieve data corresponding to the linefill request into the level M cache level.

4. The apparatus as claimed in claim 1, further comprising level M prefetch circuitry configured to prefetch data into the level M cache level,
wherein the modification of the slot allocation procedure comprises:
conditional avoidance of slot allocation in response to the lookup miss,
and wherein the linefill delegation action instructed to the level M cache level comprises instructing the level M prefetch circuitry to prefetch data corresponding to the linefill request into the level M cache level.

5. The apparatus as claimed in claim 1,
wherein the linefill slot occupancy criterion comprises at least a threshold number of the plurality of linefill slots currently having a pending linefill request allocated.

6. The apparatus as claimed in claim 1,
wherein the linefill slot occupancy criterion comprises all of the plurality of linefill slots currently having a pending linefill request allocated.

7. The apparatus as claimed in claim 2,
wherein the level N cache level is configured to select the victim slot in dependence on a request type of the previously allocated linefill request.

8. The apparatus as claimed in claim 7,
wherein the request type of the previously allocated linefill request is an architecturally non-mandatory request.

9. The apparatus as claimed in claim 8,
wherein the previously allocated linefill request pertains to branch prediction based instruction retrieval subsequently established to be mispredicted.

10. The apparatus as claimed in claim 8,
wherein the previously allocated linefill request pertains to data value retrieval initiated by a prefetch mechanism.

11. The apparatus as claimed in claim 10,
wherein the prefetch mechanism has been triggered by execution of a software prefetch instruction.

12. The apparatus as claimed in claim 8,
wherein the previously allocated linefill request pertains to speculative load/store mechanism retrieval which has subsequently been cancelled.

13. The apparatus as claimed in claim 7,
wherein the request type of the previously allocated linefill request is a relative age with respect to other allocated linefill requests in the plurality of linefill slots.

14. The apparatus as claimed in claim 1, further comprising branch prediction instruction retrieval handling circuitry,
wherein the branch prediction instruction retrieval handling circuitry is configured to receive:
a first instruction address indication corresponding to a predicted branch direction;
a second instruction address indication corresponding to the predicted branch direction not being taken;
and the branch prediction instruction retrieval handling circuitry is configured to initiate a first lookup based on the first instruction address indication in the level N cache level and to initiate a second lookup based on the second instruction address indication in the level M cache level.

15. The apparatus as claimed in claim 1,
wherein the modification of the slot allocation procedure and causation of the linefill delegation action are dependent on:
a signal indicative of a high cache miss rate above a predefined threshold at the level N cache level.

16. The apparatus as claimed in claim 1,
wherein the modification of the slot allocation procedure and causation of the linefill delegation action are dependent on at least one of:
a signal indicative of a high branch misprediction rate above a predefined branch misprediction rate threshold;
a signal indicative of a high prefetch accuracy above a predefined prefetch accuracy threshold;
a signal indicative of a high cache hit rate above a predefined cache hit rate threshold at the level M cache level; and/or
a signal indicative of a cache resource availability at the level M cache level.

17. The apparatus as claimed in claim 1,
wherein the level N cache level is a level one (L1) cache level; and
the level M cache level is a level two (L2) cache level.

18. A method of operating an apparatus comprising a level N cache level and a level M cache level, the method comprising:
in the level N cache level comprising a cache storage and a plurality of linefill slots, performing a slot allocation procedure in response to a lookup miss in the cache storage, in dependence on a linefill slot occupancy criterion, wherein the slot allocation procedure comprises allocation of an available linefill slot of the plurality of linefill slots to a pending linefill request generated in response to the lookup miss;
providing, by the linefill slot allocated to the pending linefill request, a cache line within the cache storage, to store data returned by the linefill request upon completion of the pending linefill request,
freeing the linefill slot allocated to the pending linefill request upon completion of the pending linefill request,
in the level N cache level, effecting a modification of the slot allocation procedure in dependence on the linefill slot occupancy criterion; and
in response to the linefill slot occupancy criterion being fulfilled, causing linefill delegation action to be instructed to the level M cache level.

19. A system comprising:
the apparatus of claim 1, implemented in at least one packaged chip;
at least one system component; and
a board,
wherein the at least one packaged chip and the at least one system component are assembled on the board.

20. A chip-containing product comprising the system of claim 19 assembled on a further board with at least one other product component.

* * * * *